Figure 1:
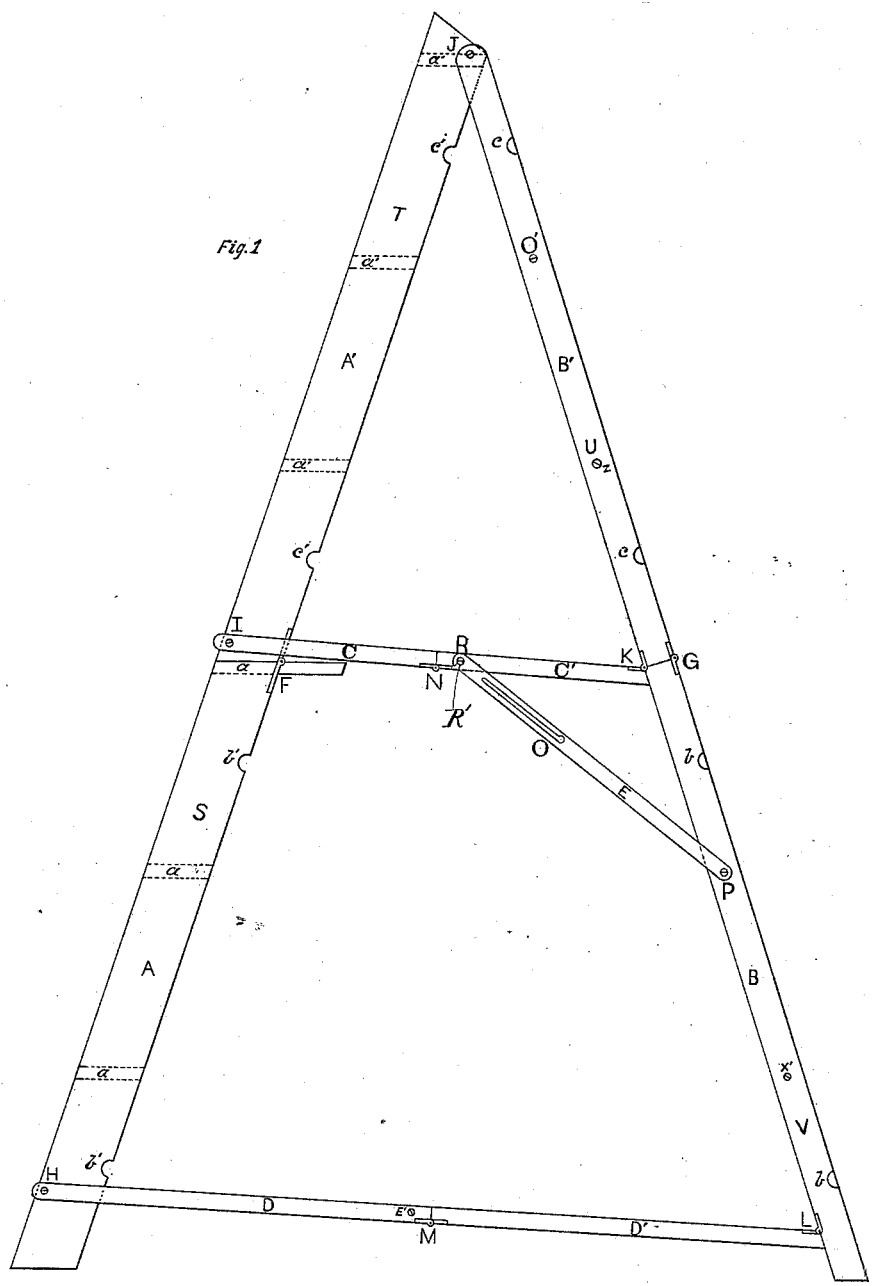

(No Model.) 3 Sheets—Sheet 1.

G. T. LAPÉ.
STEP LADDER.

No. 257,168. Patented May 2, 1882.

Witnesses.
Thomas Van Antwerp
Isaac M. Babbitt

Inventor
Geo. T. Lapé
by P. Van Antwerp
his Atty.

(No Model.) 3 Sheets—Sheet 2.
G. T. LAPÉ.
STEP LADDER.
No. 257,168. Patented May 2, 1882.
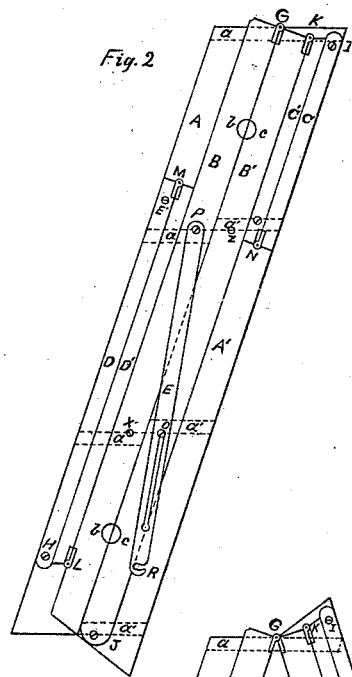
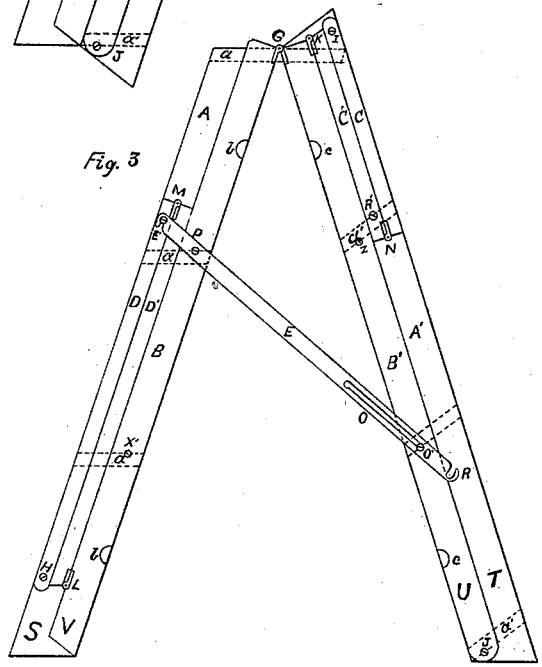
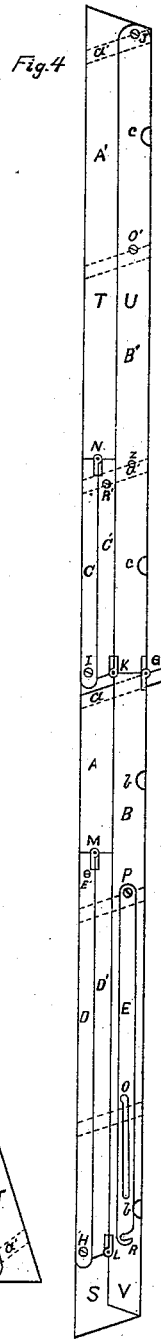
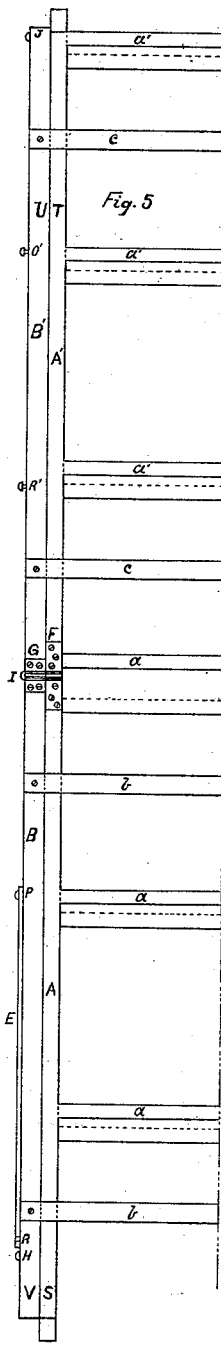
Witnesses.
Thomas Van Antwerp
Isaac M. Babbitt
Inventor
Geo. T. Lapé
by P. Van Antwerp
his Atty.

(No Model.)  G. T. LAPÉ.  3 Sheets—Sheet 3.
STEP LADDER.
No. 257,168.  Patented May 2, 1882.
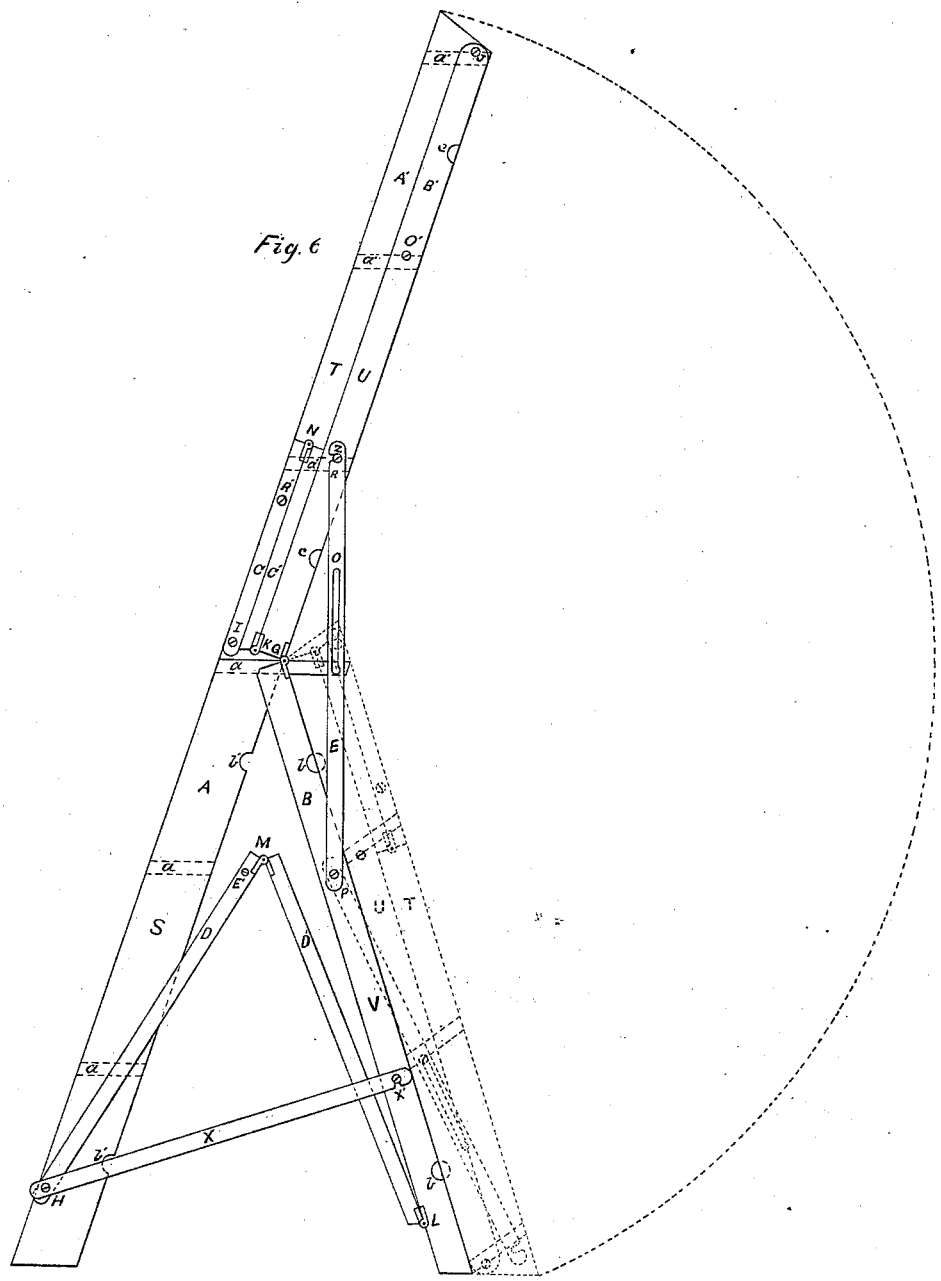

UNITED STATES PATENT OFFICE.

GEORGE T. LAPÉ, OF BROOKLYN, NEW YORK.

STEP-LADDER.

SPECIFICATION forming part of Letters Patent No. 257,168, dated May 2, 1882.

Application filed September 10, 1881. (No model.)

*To all whom it may concern:*

Be it known that I, GEORGE T. LAPÉ, of the city of Brooklyn, in the State of New York, have invented certain new and useful Improvements in Folding Extensible Step-Ladders; and I do hereby declare that the following is a full, clear, and exact description thereof, reference being had to the following drawings, forming part of this specification, in which—

Figure 1 is a side elevation of the step-ladder completely extended and ready for use. Fig. 2 is a side elevation entirely folded. Fig. 3 is a side elevation of the device opened to one-half its length. Fig. 4 is a side elevation of the device closed at full length. Fig. 5 is a rear elevation of the device at full length, closed. Fig. 6 is a side elevation of the device at full length, the upper sections closed together and the lower sections separated to form a support.

My invention relates to that class of step-ladders which are capable of being extended as to length; and it consists in so constructing the step-supporting stiles, and the legs or supports of said stiles, respectively, in sections, and so connecting the sections that said sections are capable of being folded together, permitting the use of the device as a short step-ladder, or unfolded and thereby extended to form a long step-ladder.

The device consists of two parts, the ladder and the supports or legs. The ladder is formed in two sections, S T, consisting of the stiles A A and the steps $a$, constituting the lower section thereof, and the stiles A' A' and the steps $a'$ constituting the upper section thereof, respectively. These two sections are so connected by the hinges F F that they may form a continuous ladder. They may be so folded down on said hinges that section T will act as a supporting-leg for section S, as shown in Fig. 3, or may be folded closely together, as shown in Fig. 2. The supporting-legs are also formed in two sections, U V, and said sections are connected by the hinges G G, and section T is secured to section U, at their upper extremities, by the pivots J J, the legs in each section being secured together by the transverse bars $c\ c\ b\ b$, respectively; and said legs are so secured to the sides of the stiles and outside thereof by the pivots J J that when the two are folded together the transverse bars $c\ c\ b\ b$ will be received into the recesses $c'\ c'\ b'\ b'$ in the stiles, and said legs lie outside of and alongside of said stiles, and their rear edges become flush with the rear edges of said stiles, as shown in Figs. 2, 3, 4, and 5.

The lower tie-rods, D D' are secured at one of their respective ends to the outside of the stiles by pivot-pins H H and at the other of their respective ends by hinges L L to the legs B B of section V, and serve to prevent said stiles and said legs from spreading apart when in position for use, as shown in Fig. 1.

The upper sections, T U, are retained in position for use when the device is extended by the upper tie-rods, C C', secured at one end by the pivot-pins I I to the outside of the stiles and at the other end by the hinges K to the legs. Both the lower and the upper tie-rods are jointed and fold on the hinges M M and N N, respectively, and all the hinges secured to these rods are so adjusted as to permit said rods to be folded, the two parts of said rods moving upward and toward each other during the operation of bringing the opposite sections together.

The adjustable tie-rods E are secured to the legs of section V by the pivots P, and are each provided with a hook, R, on its extremity, to engage the pin R' on the tie-rods C when all the sections are fully extended, thus preventing said tie-rods C from rising, and the consequent collapse of the structure. The pins O' on the legs B' are caused to engage the slots O of the bar E when the upper sections are folded to their respective lower sections. To the end that when the ladder is opened, as shown in Fig. 3, (the sections S V then composing the ladder part and the sections U T then composing the supporting-legs, thus forming a short step-ladder,) the said rod will prevent the two portions from spreading apart, the hook on the extremity of the rod near the pivot P on the leg B will engage the pin E' on the rod D and lock the sections S and V together.

In order to form the self-supporting ladder, as shown in Fig. 6, the sections T U are folded together, the sections S V partially unfolded and secured in the desired position by the adjustable tie-rod $x$, which is pivoted at H, and, terminating in a hook, engages the pin $x'$.

The upper sections, T U, are supported in an upright position by the adjustable rod E, which, hooking onto the pin Z on the section U, acts as a strut or brace. The dotted lines in this figure show that by the disengagement of the rod E and the folding down of the sections T U a short step-ladder is formed.

Having thus described my invention, what I claim as new, and desire to secure by Letters Patent, is—

1. A folding extensible step-ladder the ladder and legs of which are pivoted or hinged at or near one end thereof, and are each formed of two sections, which sections are so constructed and so connected by pivots or hinges as to permit each ladder-section and its corresponding leg-section to be folded together, and also the pairs of coincident sections, when folded as aforesaid, to be then folded together.

2. The jointed ladder S T, in combination with the jointed legs U V, hinged and pivoted together, substantially as and for the purpose described.

3. The jointed ladder S T, in combination with the jointed legs U V, the tie-rods C and D, and the adjustable tie-rods E, substantially as and for the purpose specified.

4. The sections S V, the sections T U, the hinges F F and G G, and the tie-rods E, all combined substantially as specified.

5. The sections S V, the hinges G G and F F, and the adjustable tie-rods $x$, in combination with the sections T U, the adjustable tie-rods E, and the pins Z on section U, substantially as and for the purpose specified.

GEO. T. LAPÉ.

Witnesses:
CHAS. G. KOSS,
THOMAS VAN ANTWERP.